United States Patent [19]

Reilly

[11] Patent Number: 5,715,762

[45] Date of Patent: Feb. 10, 1998

[54] COAL ASH DISPOSAL SYSTEM

[75] Inventor: William P. Reilly, Dunnellon, Fla.

[73] Assignee: Florida Power Corporation, St. Pete, Fla.

[21] Appl. No.: 657,049

[22] Filed: May 29, 1996

[51] Int. Cl.$^6$ ............................................. F23J 1/00
[52] U.S. Cl. ...................... 110/165 R; 110/266; 110/171; 110/259
[58] Field of Search .................................. 110/266, 259, 110/165 R, 171, 105, 106

[56] References Cited

U.S. PATENT DOCUMENTS

| | | | |
|---|---|---|---|
| 1,918,535 | 7/1933 | Greenawalt | 110/165 R |
| 3,809,436 | 5/1974 | Ciaffone. | |
| 4,321,876 | 3/1982 | Mikus et al. | 110/171 |
| 4,558,805 | 12/1985 | Margison. | |
| 4,744,314 | 5/1988 | Hoskinson. | |
| 4,790,250 | 12/1988 | Turner. | |
| 5,022,330 | 6/1991 | Burgher. | |

*Primary Examiner*—James C. Yeung
*Assistant Examiner*—Nhat-Hang H. Lam
*Attorney, Agent, or Firm*—Larson & Larson, P.A.; James E. Larson

[57] ABSTRACT

A truck is parked adjacent a coal boiler ash recovery unit and includes a first inlet pipe provided to receive ash from the recovery unit and an outlet pipe provided to convey dust from within the storage chamber of the truck to a bag house where the dust is loaded onto another truck. Water spray may be provided within the storage compartment of the first-mentioned truck to moisten the captured material to reduce dusting.

8 Claims, 3 Drawing Sheets

COAL ASH DISPOSAL SYSTEM

BACKGROUND OF THE INVENTION

The present invention relates to a coal ash disposal system. In the prior art, it is known to provide means to facilitate disposal of coal ash from a coal boiler ash recovery unit. In such a system, as known in the prior art, a piping system is typically provided to convey coal ash from the recovery unit to a location of disposal. However, the vacuum pressure that is employed in such a system causes the large ash particles to move through the piping with a force that causes severe erosion on the interior surfaces of the pipes. Applicant has found that, in such a system, many of the pipe sections have to be replaced every three months. Particular erosion problems are found on the elbows of such a system. As such, a need has developed to provide a replacement for such a system that allows equally efficient transport of ash particles to a point of disposal while minimizing the wear and tear on the system.

The following prior art is known to applicant:

U.S. Pat. No. 3,809,436 to Ciaffone
U.S. Pat. No. 4,558,805 to Margison
U.S. Pat. No. 4,744,314 to Hoskinson
U.S. Pat. No. 4,790,250 to Turner
U.S. Pat. No. 5,022,330 to Burgher et al.

While these references teach the use of a vehicle to receive ash discharge from a source of ash, none of these references appreciates the problems set forth above nor applicant's solution therefor.

SUMMARY OF THE INVENTION

The present invention relates to a coal ash disposal system. The present invention includes the following inter-related objects, aspects and features:

(1) In a first aspect, the present invention is intended for use in association with a coal boiler ash recovery unit. Such a system conveys ash to a conveyor that conveys the ash to a point of disposal.

(2) In the present invention, a first vehicle is provided having a storage chamber designed to receive ash. A first pipe may be coupled to a source of ash from the coal boiler ash recovery unit so that ash may be supplied to the storage area of the vehicle. A second pipe comprises an outlet from the storage area of the vehicle that conveys dust that arises from the ash when it is placed within the storage area to a bag house where the dust is consolidated and loaded onto a second vehicle.

(3) If desired, a nozzle may be provided in the wall of the storage area of the first vehicle so that water may be sprayed therein to reduce the amount of dust that forms.

(4) The second vehicle is coupled to a coupling of the bag house to receive dust conveyed from the storage area of the first vehicle.

(5) If desired, a station may be provided including couplings to allow coupling of the pipes of the first vehicle thereto to provide an easy means for ash disposal.

As such, it is a first object of the present invention to provide a coal ash disposal system.

It is a further object of the present invention to provide such a system including a first vehicle designed to receive ash from a coal boiler ash recovery unit.

It is a still further object of the present invention to provide such a system including a further vehicle designed to receive dust arising from loading of ash onto the first vehicle, via a bag house.

It is a yet further object of the present invention to provide such a system including a station having couplings designed to facilitate easy coupling of the first vehicle thereto.

These and other objects, aspects and features of the present invention will be better understood from the following detailed description of the preferred embodiment when read in conjunction with the appended drawing figures.

SPECIFIC DESCRIPTION OF THE PREFERRED EMBODIMENT

Figure 1:
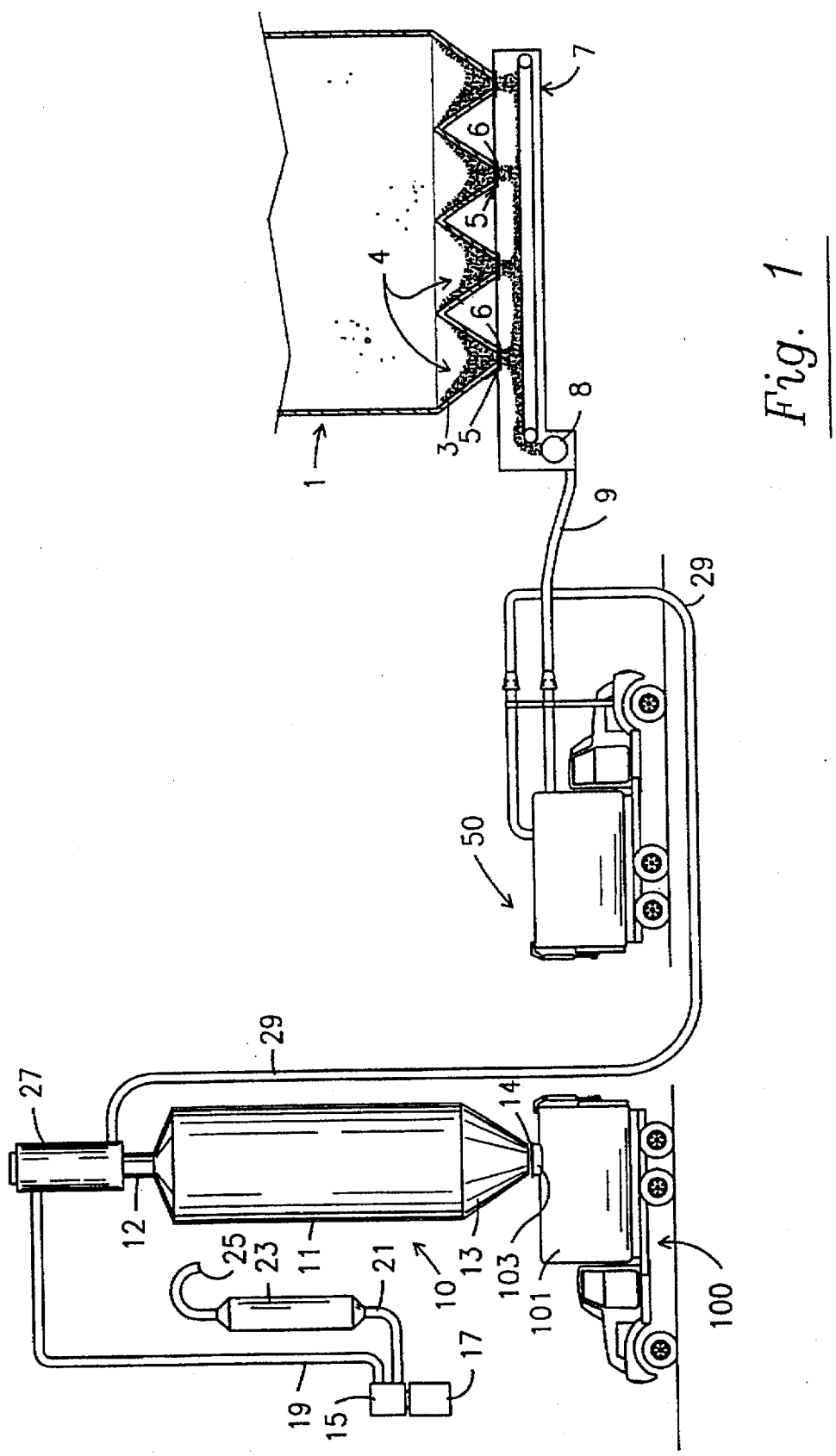
FIG. 1 shows a side schematic representation of the system of the present invention.

With reference to FIG. 1, a coal boiler ash recovery unit is generally designated by the reference numeral 1 and is seen to include an enclosure 2 having lower receptacles 3 that receive ash 4 that has been recovered from burning of combustible materials. Coal boiler ash includes bottom ash, fly ash and economizer ash.

As seen in FIG. 1, each lower receptacle 3 has an opening 5 that is preferably controlled by a gate valve 6. When the gate valve 6 is open, ash 4 may freely fall onto the conveyor belt system 7 to be conveyed in the left-hand direction in the view of FIG. 1 to a manifold 8 leading to a first pipe 9.

With further reference to FIG. 1, a bag house is generally designated by the reference numeral 10 and is seen to include a large container 11 having an inlet 12 and a funnel-shaped lower section 13 leading to an outlet 14.

The reference numeral 15 schematically represents a source of vacuum including an impeller (not shown) operated by a motor 17 and including a suction conduit 19 and a pressure conduit 21 that is vented to the atmosphere via a silencer 23 and the outlet port 25. The suction conduit 19 is connected to a further filter 27 and provides a source of suction that operates on the conduit 29. In the preferred embodiment, the source of vacuum 15 is of a size to generate air flow in the range of 2,500 cfm. Such a source of vacuum 15 requires a motor having an output in the range of 100 h.p.

Figure 2:
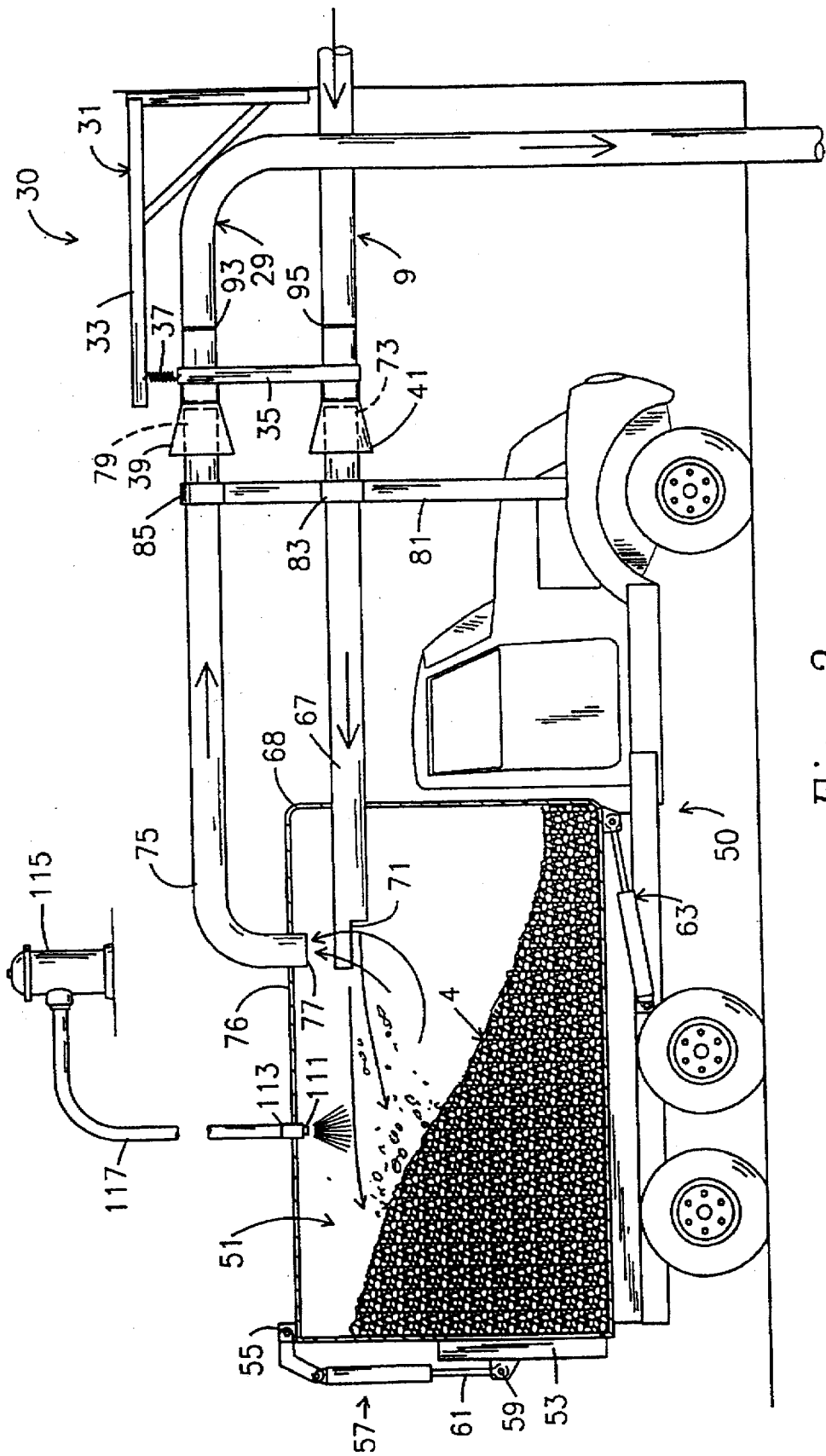
FIG. 2 shows an enlarged side view of a portion of the system depicted in FIG. 1, with portions broken away to show detail.

With reference to FIG. 2, it is seen that a station 30 is provided between the container 1 and the bag house 10 (with additional reference to FIG. 1) and the station 30 includes a framework 31 suitably mounted on a ground surface and including a horizontal support 33 that supports a fitting 35 via a resilient tension spring 37 for a purpose to be described in greater detail hereinafter. As is seen in FIG. 2, the conduits 9 and 29 are mounted to the fitting 35.

As seen in FIG. 2, the conduit 29, via the fitting 35, is fluidly connected to a funnel-shaped coupling member 39 while the conduit 9 is correspondingly fluidly connected, via the fitting 35, to a funnel-shaped coupling member 41.

With further reference to FIG. 2, a vehicle such as a truck is generally designated by the reference numeral 50 and is seen to include a storage compartment 51 including a rear access door 53 pivotably mounted on the truck 50 at a pivot 55. Hydraulic or pneumatic cylinder-piston 57 couples between the pivot 55 and a further pivot 59 mounted on the door 53 so that retraction of the piston (not shown) and the piston rod 61 will cause pivoting of the door 53 to an open position (not shown). The position of the door 53 as shown in FIG. 2 is caused by extension of the piston rod 61. A further hydraulic or pneumatic piston-cylinder 63 is also shown which controls pivoting of the container 51 to allow dumping of its contents.

As further seen in FIG. 2, a first pipe 67 is mounted on the truck 50 and extends through the front wall 68 of the truck 50 and has an outlet 71 within the container 51 as well as an inlet 73 adapted to be coupled to the funnel-shaped coupling member 41 as will be described in greater detail hereinafter. A second pipe 75 extends through a top wall 76 of the container 51 and includes an inlet 77 with in the storage area 51 thereof as well as an outlet 79 adapted to be coupled to the funnel-shaped coupling member 39 as will be described in greater detail hereinafter. A bracket 81 is mounted to each fender of the truck 50 as shown in FIG. 2 and includes mounting guide 83 for the pipe 67 as well as mounting guide 85 for the pipe 75.

Figure 3:
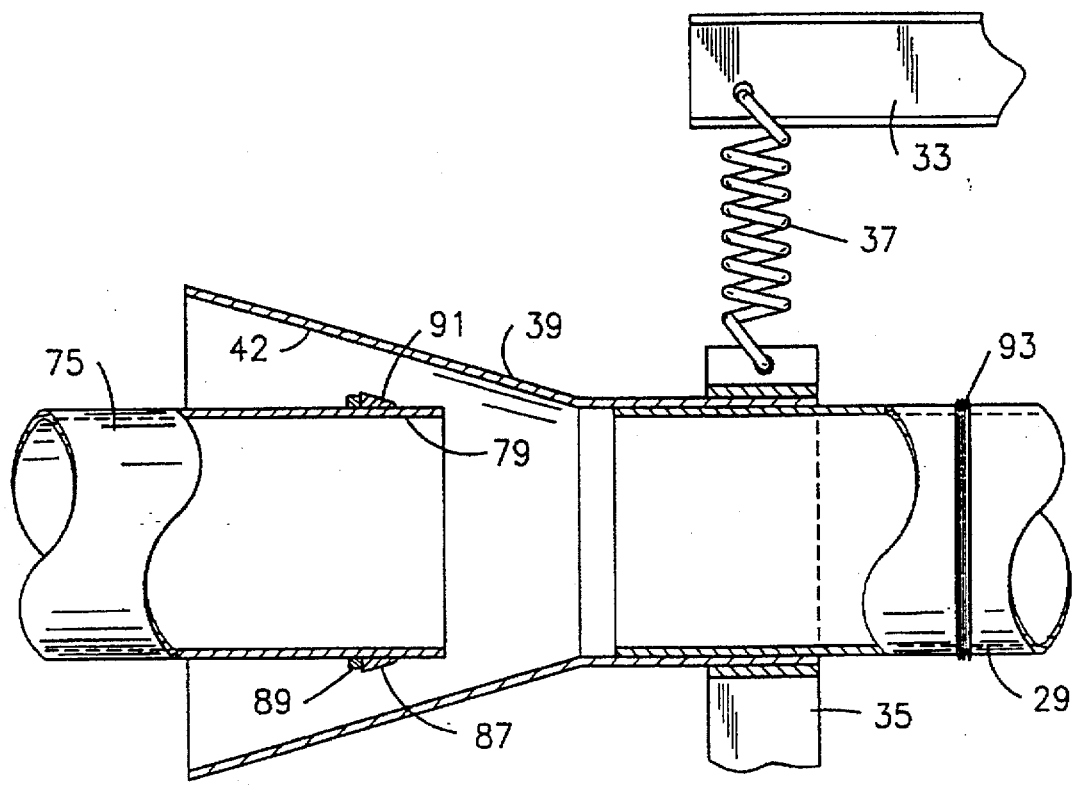
FIG. 3 shows a side view, partially in cross-section, of a coupling of the present invention adjacent a pipe of the vehicle of the system, prior to coupling.
Figure 4:
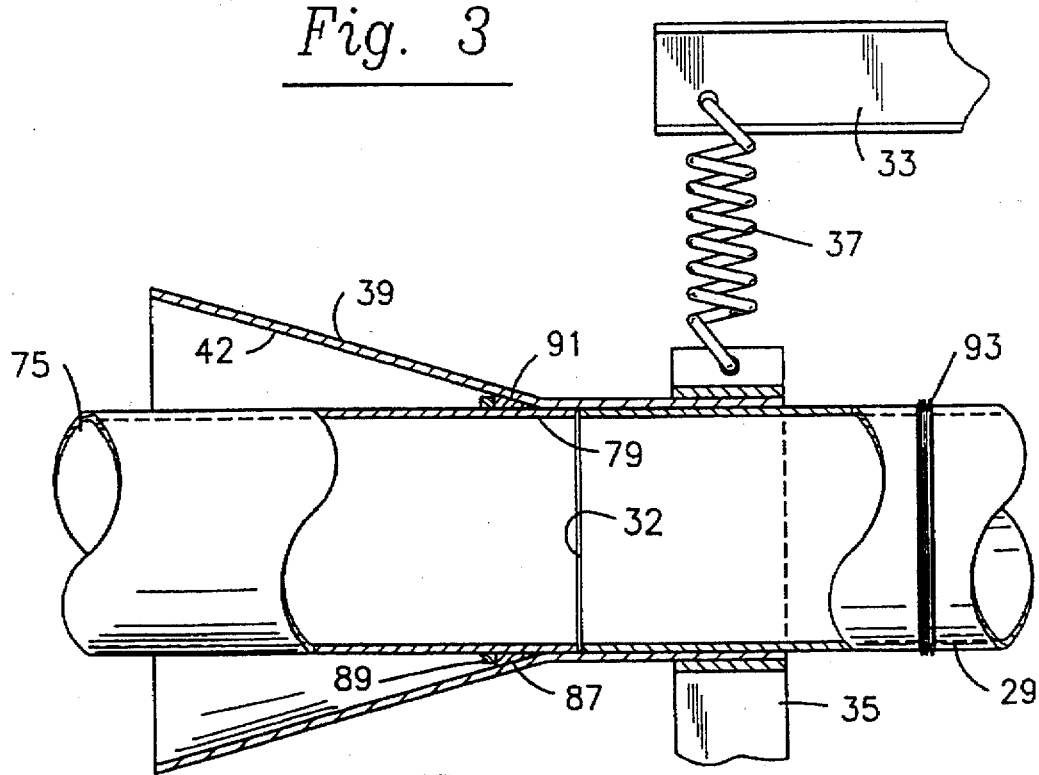
FIG. 4 shows a view similar to that of FIG. 3, but after coupling has taken place.

With reference to FIGS. 3 and 4, a more detailed description of the coupling member 39 and the pipe 75 will be made, with this description also being typical of the pipe 67 adjacent the inlet 73 thereof and the coupling member 41. As seen in FIG. 3, the pipe 75 outlet 79 is surrounded by a generally conical seal member 87 fastened in place by a suitable fastening ring 89. The coupling member 39 includes an internal surface 42 that is at the same or similar angle of taper as the surface 91 of the seal 87.

As seen in FIG. 4, when the pipe 75 is moved within the coupling member 39 such that the termination of the outlet 79 of the pipe 75 abuts against the inlet 32 of the pipe 29, the surface 91 of the seal 87 peripherally abuts the surface 42 of the coupling member 39 to seal the connection therebetween so that leakage of ash is prevented. The tension spring 37 is provided to allow adjustment between the pipe 75 and the coupling member 39 to allow compensation for variations in alignment caused by numerous factors including the degree of inflation of the tires of the vehicle 50, changes in elevation of the storage area 51 caused by operation of the shock absorbing system of the vehicle 50 responsive to increases or decreases in the weight of the vehicle 50 caused by loading or unloading of ash 4. Each stationary pipe 29 and 9 have an expansion joint 93 and 95 respectively to permit the stationary pipe 29 and 9 to float from side to side and accommodate to the pipes 75 and 67.

With reference to FIG. 1, the truck 100 includes a storage area 101 having an opening 103 alignable with the opening 14 in the container 11.

With the inventive system having been described in detail, the operation thereof should be self-evident. A vehicle 50 is driven up to the station 30 and the outlet 79 of the pipe 75 as well as the inlet 73 of the pipe 67 are aligned with the respective coupling members 39 and 41 whereupon the truck 50 is driven forward until it arrives at the position shown in FIG. 2 with the tension spring 37 allowing a combination for slight differences in elevation between the respective pipes 75 and 67 and the coupling members 39 and 41. With the pipes 75 and 67 coupled to their respective coupling members in the manner shown in FIG. 4, ash 4 from the recovery unit 1 may be conveyed via the chambers 3, openings 5, gate valves 6, conveyor belt 7, and manifold 8 via the conduit 9 to the coupling member 41 and thence through the pipe 67, outlet 71 into the storage chamber 51. Such movement of the ash 4 is facilitated through operation of the source of vacuum 15 by the operating motor 17 to provide suction through the conduit 29 via the coupling member 39, the pipe 75 and the inlet 77 thereof.

The heavier ash particles fall to the floor of the storage area 51 of the vehicle 50 while the lighter dust-like particles are sucked into the pipe 75, through the coupling member 39 and thence through the conduit 29 to the inlet 12 leading to the container 11 whereupon the dust particles consolidate and fall into the funnel-like portion 13 to the outlet 14 and thence into the storage container 101 of the vehicle 100. If desired, the top wall 76 of the vehicle 50 may be provided with a nozzle 111 connected to a fitting 113 that may be coupled to a source 115 of water under pressure via a conduit 117. Water may be sprayed into the storage compartment 51 via the nozzle 111 to prevent or reduce dust formation when the hydraulic or pneumatic piston-cylinder 63 is operated to dump the contents of the container 51.

The coal ash disposal system of this invention permits increased speed in disposal of coal ash from coal fired boilers. A typical prior art unit can dispose of only about 8 tons per hour of coal ash whereas with the system described above, three times as much coal ash can be disposed of within the same time period. In addition, additional coal fired boilers can be directed to the same bag house so there is no need for separate bag houses for each boiler unit.

As such, an invention has been disclosed in terms of a preferred embodiment thereof which fulfills each and every one of the objects of the invention as set forth hereinabove and provides a new and useful coal ash disposal system of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A coal boiler ash disposal system including:
   a) an ash collection area and a conduit extending from said area and terminating at a first coupling;
   b) a vehicle having a first storage container and including a first pipe having an inlet adapted to be coupled to said conduit first coupling, said first pipe having an outlet within said first container;
   c) a bag house having a second storage container and a second pipe extending from said second container to a second coupling adjacent said first coupling;
   d) said vehicle having a third pipe having an inlet within said first storage container and an outlet adjacent said first pipe inlet adapted to be coupled to said second coupling;
   e) a source of vacuum acting upon said second pipe to cause flow toward said bag house second storage container;
   f) said vehicle being movable into adjacency with said couplings whereby said conduit may be coupled to said first coupling and said third pipe outlet may be coupled to said second coupling and whereby when said source of vacuum is activated, ash is drawn from said collection area through said conduit, said first coupling, said first pipe and into said first storage container, and further whereby dust accumulating in said first storage container is drawn through said third pipe, through said second coupling and said second pipe and into said second storage container.

2. The system of claim 1, wherein each coupling is funnel-shaped.

3. The system of claim 2, wherein surrounding said first pipe inlet and third pipe outlet are respective peripheral seals adapted to sealingly couple said first and third pipes to said first and second couplings, respectively.

4. The system of claim 2, wherein said couplings are mounted on a frame via a tension spring allowing vertical adjustment of position thereof to accommodate to varying heights of said first pipe inlet and second pipe outlet.

5. The system of claim 1, further including a nozzle mounted in said first container and connectable to a source of water pressure.

6. The system of claim 1, further including a further vehicle having a third storage container having an inlet alignable with an outlet of said second storage container to receive said dust.

7. The system of claim 1, wherein said ash collection area includes a conveyor belt leading to a manifold connected to said conduit.

8. The system of claim 1, said vehicle including a pivotable door allowing access to said first storage container.

* * * * *